United States Patent Office 3,557,128
Patented Jan. 19, 1971

3,557,128
CERTAIN PYRIDYL FORMAMIDINE DERIVATIVES
László Pallos and Pál Benkó, Budapest, Hungary, assignors to Egyesult Gyogyszer-es Tapszergyar, Budapest, Hungary
No Drawing. Filed Mar. 4, 1968, Ser. No. 709,915
Claims priority, application Hungary, Mar. 4, 1967,
EE 1,346
Int. Cl. C07d 31/46
U.S. Cl. 260—294.9       1 Claim

ABSTRACT OF THE DISCLOSURE

The N-aryl or N-pyridyl N',N'-mono or disubstituted formamidines of this invention are prepared by reacting the appropriate N-aryl or N-pyridyl formamidine in the presence of an alkyl halide. The N-aryl or N-pyridyl-N', N'-substituted formamidines produced by this process have anthelmintic, ascaracidal and herbicidal properties.

---

The invention relates to a new process for the preparation of N,N'-substituted formamidines having anthelmintic, ascaricide and herbicide effects as well as to new N,N'-substituted formamidines obtainable by the said process.

The methods described in the literature for the preparation of N-alkyl-N'-substituted formamidines differ to a certain degree from the synthesis methods of N,N-dialkyl-N'-substituted formamidines. In the former case (cf. e.g., U.S. Pat. 3,119,831) N-substituted-formimino-alkyl ethers are reacted with alkyl amines. This method has been used also by the present applicants for the preparation of novel pyridyl and naphthyl formamidines (cf. Hungarian patent applications EE—1,260 and EE—1,250). Besides the doubtless advantages of this process (the economical availability of the formimino ethers and the high reaction rate) it can be considered as a drawback that amines are used as reaction partners and the preparation costs of such amines are in many cases quite high.

The synthesis of N,N-dimethyl-N'-substituted formamidines has been performed, on the other hand by reacting dimethylformamide with aryl isocyanates (U.S. Pat. 3,189,648); or the dimethylformamide has been reacted with aryl amines in the presence of aryl sulfonyl halides or thionyl halides (cf. U.S. Pat. 3,188,316, U.S. Pat. 3,184,482, U.S. Pat. 3,153,033, U.S. Pat. 3,073,851, U.S. Pat. 3,139,078, U.S. Pat. 3,182,053) to yield N,N-dimethyl-N'-substituted formamidines. These synthesis methods can be used only in the case of a narrower class of compounds than the said method starting from formamino ethers. There is known an even more special reaction (Angew. Chem. 75, 825, 1963), according to which the amino pyridines or nitroanilines used as starting materials were formylated with dimethylformamide dimethyl acetal to yield N,N-dimethyl-N'-substituted formamidines.

The present invention provides a new method for the preparation of the di- or trisubstituted formamidines of the general Formula I:

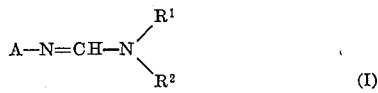
(I)

In this formula A represents a phenyl or alkylphenyl radical which is unsubstituted or substituted by one or two lower alkyl, lower alkoxy, halogen, nitro or trihalomethyl substituents and the aryl moiety of the aralkyl radical contains 1 to 3 carbon atoms; further it may represent a pyridyl radical, unsubstituted or substituted by one or two lower alkyl, halogen or nitro substituents, or a naphthyl or tetrahydronaphthyl radical; $R^1$ represents a straight or branched chain aliphatic hydrocarbon radical of 1 to 16 carbon atoms, a cycloalkyl radical of 5 to 8 carbon atoms, a dialkylaminoalkyl, carboethoxy or nitrile radical, a hydroxy-substituted alkyl radical, e.g. β-hydroxyethyl, β-hydrooxypropyl, β-hydroxybutyl, γ-hydroxypropyl, or an aralkyl radical unsubstituted or substituted by one or two equal or different halogen, nitro, lower alkoxy or trihalomethyl substitutents and having in the alkyl moiety 1 to 3 carbon atoms; $R^2$ represents hydrogen or a straight or branched chain alkyl radical having 1 to 16 carbon atoms.

The following compounds may be mentioned as examples of the new compounds obtainable by the process of the invention:

N-(3-pyridyl)-N'-n-heptyl-formamidine
N-(4-pyridyl)-N'-n-heptyl-formamidine
N-(4-pyridyl)-N'-cyclohexyl-formamidine
N-(2-pyridyl)-N'-(β-hydroxyethyl)-formamidine-fumarate
N-(5-nitro-2-pyridyl)-N'-(γ-hydroxypropyl)-formamidine
N-(3-pyridyl)-N'-cyano-formamidine
N-(3-pyridyl)-N'-carboethoxy-formamidine The compounds of the general Formula I defined above are prepared according to the invention by reacting an N-substituted formamidine of the general Formula II $$A-N=CH-NH_2 \qquad (II)$$

wherein A has the same meaning as above, with a halide of the general Formula III $$R^1-X \qquad (III)$$

wherein $R^1$ has the same meanings as above and X represents a halogen atom; in the case of products of the Formula I, wherein $R^1$ and $R^2$ have difficult meanings, the obtained compound of the general Formula IV (these are compounds of the Formula I, wherein $R^2=H$)

$$A-N=CH-NH-R^1 \qquad (IV)$$

wherein A and $R^1$ have the same meanings as above, is further reacted with an alkyl halide of the general Formula V $$Q-X \qquad (V)$$

wherein Q represents a straight or branched chain alkyl radical having 1 to 16 carbon atoms and X has the same meaning as above; the product of the general Formula I obtained by this method, may be converted, if desired, into a salt or the obtained salt may be converted into the corresponding free base.

It has been found that the process of the present invention may be carried out preferably by reacting the formamidine of the General Formula II with 1 to 2 moles of the halide of the Formula III, in the temperature range of 10° to 200° C. The reaction of the formamidine of the Formula IV with the alkyl halide of the Formula V can be performed preferably also at 10° to 200° C., preferably with a small excess of the formamidine.

The N-substituted-N'-alkyl- or dialkyl-formamidines or the salts thereof can be used in themselves or in combination with other biologically active and/or activity-potentiating compounds for the preparation of pharmaceutical compositions, by the aid of the usual pharmaceutical carriers and adjuvants.

The process of the invention is illustrated by the following examples, without being restricted to them.

EXAMPLE 1

15.46 g. (0.1 mol.) of N-(m-chlorophenyl)-formamidine in 250 ml. ethanol are reacted with 28.4 g. (0.2 mol.) methyl iodide for 5 hours at 45–50° C. The solvent is then distilled off, the residue is dissolved in 100 ml. of an 8% sodium hydroxide solution and the solution is then extracted with chloroform. After drying and distilling off the solvent, the obtained crude product is fractionated in vacuo. 13.7 g. (75%) of N-(m-chlorophenyl)-N',N'-dimethyl-formamidine is obtained in this way; B.P. at 0.1 mm. Hg 102–105° C.

EXAMPLE 2

19.36 g. (0.1 mol.) of N-(2-nitro-4-chlorophenyl)-formamidine are reacted with 18.98 g. (0.2 mol.) of methyl bromide in 200 ml. ethanol, under 1.5 to 2 atm. pressure. After reacting for 3 hours, 80 ml. of 10% sodium hydroxide solution are added to the reaction mixture, which is then extracted with benzene. The solvent is distilled off from the benzene extract and the obtained oil is mixed with ethanol containing an equivalent amount of hydrochloric acid; the obtained hydrochloride of N-(2-nitro-4-chlorophenyl)-N',N'-dimethyl-formamidine is separated by filtration. Yield: 19 g. (72%), M.P. 204° C.

EXAMPLE 3

154.61 g. (1 mol.) of N-(o-chlorophenyl)-formamadine are reacted with 165.08 g. (1 mol.) of n-hexyl bromide in 500 ml. of benzene by refluxing for 4 hours. The reaction mixture is stirred vigorously with 400 ml. of 10% sodium hydroxide solution, the benzene layer is then separated and the benzene distilled off. The crude product obtained in this way is fractionated in vacuo. 150.5 g. (63%) of N-(o-chlorophenyl)-N'-n-hexyl-formamidine is obtained; B.P. at 0.2 mm. Hg 140–142° C.

EXAMPLE 4

121.19 g. (1 mol.) of N-(4-pyridyl)-formamidine and 163.07 g. (1 mol.) bromo-cyclohexane in 650 ml. benzene are refluxed for 4 hours. 400 ml. of 10% sodium hydroxide solution are then added under vigorous stirring and the phases are then separated. The benzene is distilled off from the organic phase; N-(4-pyridyl)-N'-cyclohexyl-formamidine is obtained in the form of a quickly solidifying oil. Yield: 128 g. (63%); M.P. 110–115° C.

EXAMPLE 5

170.22 g. (1 mol.) of N-(β-naphthyl(-formamidine in 600 ml. of abs. ethanol are refluxed for 3 hours with 132.9 g. (1.05 mol.) benzyl chloride and the formed hydrochloride of N-(β-naphthyl)-N'-benzyl-formamidine is separated by filtration. Yield: 223 g. (75%); M.P. 216–217° C.

EXAMPLE 6

121.196 g. (1 mol.) N-(2-pyridyl)-formamidine and 80.52 g. (1 mol.) of ethylene chlorohydrine are reacted in the presence of 69 g. (0.5 mol.) of potassium carbonate for 5 hours at 75–85° C. The reaction mixture is then cooled to 50° C., mixed with the solution of 116 g. (1 mol.) of fumaric acid in 4000 ml. ethanol and then filtered while warm. The obtained N-(2-pyridyl)-N'-(β-hydroxyethyl)-formamidine fumarate crystallizes on cooling. Yield: 168.5 g. (60%); M.P. 177–178° C.

EXAMPLE 7

121.19 g. (1 mol.) of N-(3-pyridyl)-formamidine are reacted with 105.9 g. (1 mol.) of bromocyan in ethanol at 30–35° C. During the reaction time of 7 hours 69 g. (0.5 mol.) of potassium carbonate are added gradually to the reaction mixture; at the end of the reaction the precipitated potassium bromide is removed by filtration, the ethanol is distilled off and the residue is recrystallized repeatedly from benzene. 67.2 g. (43%) of N-(3-pyridyl)-N'-cyano-formamidine are obtained; M.P. 228–229° C.

EXAMPLE 8

16.5 g. (0.1 mol.) of N-(2-pyridyl)-N'-(β-hydroxyethyl)-formamidine are reacted with 14.4 g. (0.1 mol.) of methyl iodide in 250 ml. of ethanol for 5 hours at 30–40° C. The solvent is then distilled off, the residue is suspended in an aqueous sodium hydroxide solution, the suspension is shaken with chloroform and the aqueous layer is separated. The chloroform solution is dried over anhydrous sodium sulphate and the solvent is distilled off. The N-(2-pyridyl)-N'-methyl-N'-(β-hydroxyethyl)-formamidine obtained as an oily product is boiling under 0.05 mm. mercury at 105–115° C.

| Compound: | B.P./mm.Hg or M.P. | Yield, percent | Prepared according to Example No. |
| --- | --- | --- | --- |
| N-(o-chlorophenyl)-N',N'-dimethyl-formamidine | 90–93°/0.15 | 70 | 1 |
| N-(3,4-dichlorophenyl)-N',N'-dimethyl-formamidine | 130–135°/0.2 | 68 | 1 |
| N-(3,4-dichlorophenyl)-N',N'-diethyl-formamidine | 130–132°/0.1 | 90 | 1 |
| N-(o-nitrophenyl)-N',N'-dimethyl-formamidine | 150–153°/1 | 79 | 1 |
| N-(m-nitrophenyl)-N',N'-dimethyl-formamidine | 58–60° | 50 | 1 |
| N-(2-methyl-5-nitrophenyl)-N',N'-dimethyl-formamidine HCl | 206° | 78 | 2 |
| N-phenyl-N',N'-dimethyl-formamidine | 73–78°/0.1 | 76 | 1 |
| N-(2-pyridyl)-N',N'-dimethyl-formamidine | 68–70°/0.05 | 83 | 1 |
| N-(3-pyridyl)-N',N'-dimethyl-formamidine | 81–82°/0.1 | 76 | 1 |
| N-(4-pyridyl)-N',N'-dimethyl-formamidine | 59–61° | 85 | 1 |
| N-(2-pyridyl)-N'-n-butyl-formamidine | 177–181°/15 | 92 | 3 |
| N-(2-pyridyl)-N'-n-octyl-formamidine | 165–169°/0.1 | 90 | 3 |
| N-(2-pyridyl)-N'-dodecyl-formamidine | 179–185°/0.05 | 85 | 3 |
| N-(2-pyridyl)-N'-n-hexyl-formamidine | 128–133°/0.05 | 80 | 3 |
| N-(2-pyridyl)-N'-n-heptyl-formamidine | 158–160°/0.1 | 72 | 3 |
| N-(3-pyridyl)-N'-n-heptyl-formamidine | 142–150°/0.05 | 53 | 3 |
| N-(4-pyridyl)-N'-n-heptyl-formamidine | 180–182°/1 | 74 | 3 |
| N-(2pyri-dyl)-N'-benzy-formamidine | 60–63° | 71 | 4 |
| N-(α-naphthyl)-N'-n-heptyl-formamidine | 78–80° | 87 | 4 |
| N-(α-naphthyl)-N'-n-butyl-formamidine | 136–138°/0.1 | 78 | 3 |
| N(α-naphthyl)-N'-cycloocytl-formamidine HCL | 150–152° | 62 | 4 |
| N-(β-naphthyl)-N'-n-octyl-formamidine | 50–53° | 68 | 4 |
| N-(α-naphthyl)-N'-(2-diethylaminoethyl)-formamidine | 97–100°/0.1 | 60 | 3 |
| N-α-(-naphthyl) N'-cyclohexyl-formamidine | 130–132 | 55 | 4 |
| N-(3-pyridyl)-N'-cyclohexyl-formamidine | 121–122° | 69 | 4 |
| N-(4-pyridyl)-N'-benzyl-formamidine 2HCL | 204–207° | 83 | 5 |
| N-(α-naphthyl)-N'-(3,4-dimethoxyphenylethyl)-formamidine HCl | 170–172° | 61 | 5 |
| N-(α-naphthyl)-N'-benzyl-formamidine | 105–107° | 76 | 4 |
| N-(α-naphthyl)-N'-cyclohexyl-formamidine | 78–82° | 73 | 4 |
| N-(3,4-dichloropheynl)-N'-n-hexyl-formamidine | 170–175°/0.3 | 83 | 3 |
| N-(o-tolyl)-N'-n-hexyl-formamidine | 130–132°/0.1 | 85 | 3 |
| N-(p-tolyl)-N'-octn-yl-formamidine | 172–176°/0.1 | 73 | 3 |
| N-(2,6-dimethylphenyl)-N'-n-octyl-formamidine | 154–157°/0.2 | 70 | 3 |
| N-(2,4-dimethylphenyl)-N'-n-hexyl-formamidine | 137–141°/0.05 | 62 | 3 |
| N-(2,3-dimethylphenyl)-N'-n-hexyl-formamidine | 143–147°/0.05 | 55 | 3 |
| N-(2,4-dimethylphenyl)-N'-n butyl-formamidine | 116–118°/0.1 | 53 | 3 |
| N-phenyl-N'-n-butyl-formamidine | 103–105°/0.05 | 53 | 3 |
| N-phenyl-N'-n-octyl-formamidine | 127–132°/0.05 | 65 | 3 |
| N-phenyl-N'-n-dodecyl-formamidine | 170–171°/0.05 | 83 | 3 |
| N-phenyl-N',N'-di-n-propyl-formamidine | 108–110°/0.3 | 75 | 1 |
| N-phenyl-N',N'-di-n-butyl-formamidine | 100–102°/0.1 | 78 | 1 |
| N-phenyl-N',N'-di-n-amyl-formamidine | 130–132°/0.2 | 86 | 1 |
| N-(p-ethoxyphenyl)-N'-n-hexyl-formamidine | 168–171°/0.6 | 63 | 3 |

What we claim is:
1. A pyridyl formamidine of the formula

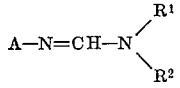

wherein A is a pyridyl radical; $R^1$ is cyano or hydroxyethyl, and $R^2$ is hydrogen or methyl and the fumarate salts thereof.

References Cited

UNITED STATES PATENTS

| | | | |
|---|---|---|---|
| 2,846,411 | 8/1958 | Meyer et al. | 260—564X |
| 3,119,831 | 1/1964 | Homer et al. | 260—296 |

OTHER REFERENCES

Noller Chemistry of Organic Compounds, Saunders (1951), first edition, pp. 229 and 237.

Pinner et al.: Chem. Ber. vol. 10, pp. 1889–95 (1877).

ALAN L. ROTMAN, Primary Examiner

U.S. Cl. X.R.

260—295, 295.5, 296, 564, 999